United States Patent
Murray, Jr. et al.

(10) Patent No.: US 12,017,596 B2
(45) Date of Patent: Jun. 25, 2024

(54) ACCELERATION SENSOR

(71) Applicant: ZF ACTIVE SAFETY AND ELECTRONICS US LLC, Livonia, MI (US)

(72) Inventors: Neil G. Murray, Jr., Wixom, MI (US); Mark W. Ramsay, Livonia, MI (US); Brilleasha M. Moore, Clinton Township, MI (US)

(73) Assignee: ZF ACTIVE SAFETY AND ELECTRONICS US LLC, Livonia, MI (US)

( * ) Notice: Subject to any disclaimer, the term of this patent is extended or adjusted under 35 U.S.C. 154(b) by 548 days.

(21) Appl. No.: 17/276,206

(22) PCT Filed: Sep. 17, 2019

(86) PCT No.: PCT/US2019/051411
§ 371 (c)(1),
(2) Date: Mar. 15, 2021

(87) PCT Pub. No.: WO2020/076464
PCT Pub. Date: Apr. 16, 2020

(65) Prior Publication Data
US 2022/0032868 A1  Feb. 3, 2022

Related U.S. Application Data (60) Provisional application No. 62/743,599, filed on Oct. 10, 2018.

(51) Int. Cl.
*G01P 1/02* (2006.01)
*B60R 21/0132* (2006.01)
*G01P 15/08* (2006.01)

(52) U.S. Cl.
CPC .......... *B60R 21/0132* (2013.01); *G01P 1/023* (2013.01); *G01P 15/0891* (2013.01)

(58) Field of Classification Search
CPC .... G01P 1/023; G01P 1/00; G01P 1/02; G01P 15/00; G01P 15/0891; B60R 21/0132
(Continued)

(56) References Cited

U.S. PATENT DOCUMENTS

| | | |
|---|---|---|
| 4,272,145 A | 6/1981 | Laduke |
| 5,571,994 A | 11/1996 | Norton |

(Continued)

*Primary Examiner* — Hai L Nguyen
(74) *Attorney, Agent, or Firm* — ROSSI, KIMMS & McDOWELL LLP (57) ABSTRACT

An apparatus for measuring vehicle acceleration includes a housing comprising an interior space and one or more contacts supported in the housing. Each contact includes a pin portion extending outside the housing and a spring contact portion positioned above an ASIC receptacle inside the housing. An accelerometer ASIC is positioned the ASIC receptacle. The accelerometer ASIC includes contact pads that engage and deflect the spring contact portions. The resilient spring characteristics of the spring contact portions applying a retention force on the accelerometer ASIC. A retention clip connected to the housing has a portion extending into the interior space and includes a portion that engages the housing to secure the retention clip in the housing. The retention clip includes portions that engage and maintain the position(s) of the contact(s) inside the housing, and portions that engage the accelerometer ASIC and maintain the position of the accelerometer ASIC inside the housing.

10 Claims, 9 Drawing Sheets

(58) Field of Classification Search
USPC .......................................................... 73/488
See application file for complete search history.

(56) References Cited

U.S. PATENT DOCUMENTS

| | | | |
|---|---|---|---|
| 5,747,761 A | 5/1998 | Masuda | |
| 8,596,120 B2* | 12/2013 | Ludwig | H05K 3/326 |
| | | | 73/866.5 |
| 9,107,309 B2* | 8/2015 | Kurle | H05K 5/06 |
| 9,587,816 B2 | 3/2017 | Peters et al. | |
| 9,891,081 B2 | 2/2018 | Henzler et al. | |
| 10,741,955 B2 | 8/2020 | Forwerck | |
| 2011/0197673 A1 | 8/2011 | Ludwig | |
| 2012/0072047 A1 | 3/2012 | Forwerck et al. | |
| 2018/0090868 A1 | 3/2018 | Forwerck | |

\* cited by examiner

ACCELERATION SENSOR

CROSS REFERENCES TO RELATED APPLICATIONS

This application filed under 35 U.S.C § 371 is a national phase application of International Application Serial Number PCT/US2019/051411, filed Sep. 17, 2019, which claims the benefit of U.S. Provisional Patent Application Ser. No. 62/743,599 filed Oct. 10, 2018, the subject matter of which are incorporated herein by reference in their entirety.

FIELD OF THE INVENTION

The present invention is directed to vehicle crash sensors and is more particularly directed to an acceleration pressure sensor for being mounted in a vehicle.

BACKGROUND OF THE INVENTION

Vehicle occupant protection systems can include one or more vehicle occupant protection devices, such as airbags, that are actuatable (e.g., inflatable) to help protect vehicle occupant(s) upon the occurrence of an event for which occupant protection is desired, such as a crash or collision. The protection system can also include a controller for controlling the actuation of the protection devices, and one or more sensors for monitoring vehicle conditions and providing a signal indicative of those conditions to the controller. The controller is configured to detect the occurrence of an event for which occupant protection is desired in response to the signal(s) provided by the sensor(s). When the controller detects the occurrence of such an event, it can actuate the vehicle occupant protection device(s) to help protect the occupant(s) of the vehicle.

Vehicle crash sensors can include mechanical devices, such as switches, that close in response to deformation of the vehicle or a sudden deceleration of the vehicle. The closure of the mechanical device causes a signal indicative of these sensed conditions to the controller, which can use these conditions to determine the occurrence of a vehicle crash condition. The controller can actuate the protection device(s) in response to this determination.

Other vehicle crash sensors can include electrical devices, such as accelerometers, that are configured to sense a vehicle condition and provide an output signal commensurate with that sensed condition. For example, an accelerometer can be configured to sense vehicle acceleration in different directions and can provide to the controller a signal commensurate with the sensed acceleration in the assigned directions. When the controller determines that the signal from the sensor reaches or crosses a threshold level, it can determine the occurrence of a vehicle crash condition and actuate the protection device(s).

One particular accelerometer device is a remote acceleration sensor (RAS) device. RAS devices can be mounted remotely from the controller, at various locations throughout the vehicle, in order to sense vehicle acceleration at those locations and provide a signal indicative of the sensed acceleration to the controller. RAS devices can, for example, be mounted laterally in a vehicle, e.g., adjacent or near a door, in order to sense lateral vehicle accelerations, such as those associated with a side impact and/or a vehicle rollover.

SUMMARY OF THE INVENTION

A solderless assembly of an acceleration sensing component including an acceleration sensing ASIC, wherein the ASIC is mounted in a terminal block with spring loaded terminal contacts. The spring loaded contacts interface with the ASIC through spring compression that holds the contacts against a contact surface of the ASIC body. This maintains a compressive spring force of the contacts against the contact surface of the ASIC, thus maintaining constant electrical contact for signal communication to vehicle systems via terminal ends of the contacts. This eliminates the use of traditional electronic manufacturing processes, such as printed circuit boards (PCBs) and soldering, and provides a high reliability electrical interface during crash sensing.

According to one aspect, a vehicle safety system includes one or more vehicle occupant protection devices, a controller for controlling actuation of the protection device(s), and a remote acceleration sensor (RAS) device for being mounted remotely from the controller and sensing vehicle acceleration. The RAS device provides a signal indicative of the sensed acceleration changes to the controller.

According to another aspect, an apparatus for measuring vehicle acceleration includes a housing comprising an interior space and one or more contacts supported in the housing. Each of the contacts include a pin portion that extends outside the housing and a spring contact portion positioned above an ASIC receptacle inside the housing. An accelerometer ASIC is positioned the ASIC receptacle in the housing. The accelerometer ASIC includes contact pads that engage the spring contact portions of the one or more contacts and cause the spring contact portions to deflect. The resilient spring characteristics of the spring contact portions apply a retention force on the accelerometer ASIC. A retention clip is connected to the housing and has a portion extending into the interior space. The retention clip includes a portion that engages the housing to secure the retention clip in an installed condition in the housing. The retention clip includes portions that engage the one or more contacts and maintain the position of the one or more contacts inside the housing and portions that engage the accelerometer ASIC and maintain the position of the accelerometer ASIC inside the housing.

According to another aspect, alone or in combination with any other aspect, the housing can include a contact support surface upon which the one or more contacts are supported and contact openings through which the contact pins extend. The retention clip can be fully inserted through the contact openings and positioned against the contact support surface.

According to another aspect, alone or in combination with any other aspect, the retention clip can include a retention element that engages the housing and retains the retention clip in the housing.

According to another aspect, alone or in combination with any other aspect, the apparatus can also include an encapsulation that encapsulates the housing and the retention clip with the one or more contacts and acceleration ASIC installed. The encapsulation can include a weatherproof material that forms a weather tight seal of the housing.

According to another aspect, alone or in combination with any other aspect, the apparatus can also include a connection bushing that connected via the encapsulation.

According to another aspect, alone or in combination with any other aspect, the encapsulation can include a connector portion that surrounds the pin portions of the contacts and facilitates a connection with vehicle wiring to electrically connect the apparatus to a controller.

According to another aspect, alone or in combination with any other aspect, the connector portion can include a female receptacle configured to receive a male plug, the connector portion further comprising a projection for locking the plug in the installed condition.

According to another aspect, alone or in combination with any other aspect, a vehicle safety system can include the apparatus. The vehicle safety system can also include a safety device and a controller for controlling actuation of the safety device. The apparatus can be electrically connected to the controller and operative to provide a signal to the controller indicative of sensed vehicle accelerations. The controller can be configured to actuate the safety device in response to the signal.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
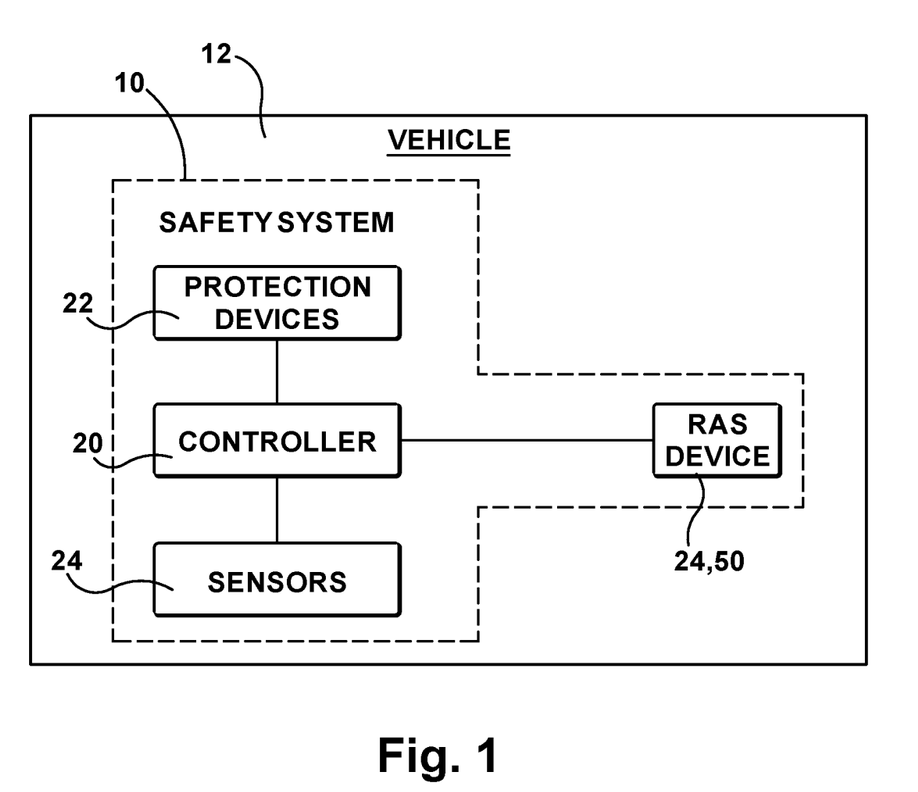
FIG. 1 is a block diagram illustrating a vehicle safety system.

Referring to FIG. 1, a vehicle 12 includes a vehicle safety system 10. The vehicle safety system 10 includes a controller 20 that is operatively connected to protection devices 22, such as airbags. The controller 20 is also operatively connected to sensors 24 configured to sense various vehicle and/or occupant conditions and transmit signals representative of those sensed conditions to the controller. The controller 20 is configured to interpret the sensed conditions to determine the occurrence of an event for which occupant protection is desired, such as a vehicle impact or collision, referred to herein as a "vehicle crash condition." The controller 20 is further configured to actuate the protection devices 22 in response to determining the vehicle crash condition.

As shown in FIG. 1, the sensors 24 include an apparatus in the form of a remote acceleration sensor ("RAS device") 50 that is mounted in a vehicle location remote from the controller 20. The RAS device 50 can, for example, be mounted in the side structure of the vehicle 12 (e.g., in a vehicle door, pillar, front/rear bumper area, etc.). This RAS device 50 detects vehicle accelerations in these remote areas of the vehicle 12 and provides a signal indicative of those accelerations to the controller 20. The controller analyzes the acceleration signal to determine if the sensed acceleration is characteristic of a predetermined vehicle event, such as a collision and/or a rollover event. The controller 20 can actuate the one or more protection devices 22 in response to this determination.

The RAS device 50 can be mounted in locations in the vehicle 12 where it will be exposed to harsh environmental conditions. As such, the RAS device 50 must be robust to temperature extremes, moisture, dirt, etc. Accordingly, the RAS device 50 has a sealed, water-tight construction. Typically, remote acceleration sensors include an accelerometer application specific integrated circuit (ASIC) that is mounted on a printed circuit board or other similar structure via traditional methods, such as soldering or compliant pins. This assemblage is then encapsulated in a watertight housing. Advantageously, the RAS device 50 is configured to avoid these traditional assembly techniques and provides a construction that is simple and mechanical in nature.

The RAS device 50 can be configured for mounting in the vehicle 12 in a variety of manners, which depend, for example, on the location in the vehicle and the architecture available at that location. The configuration can also depend on the environment to which the device will be exposed. For instance, where exposed to vehicle exterior conditions, the RAS device 50 can be hermetically sealed.

Figure 2:
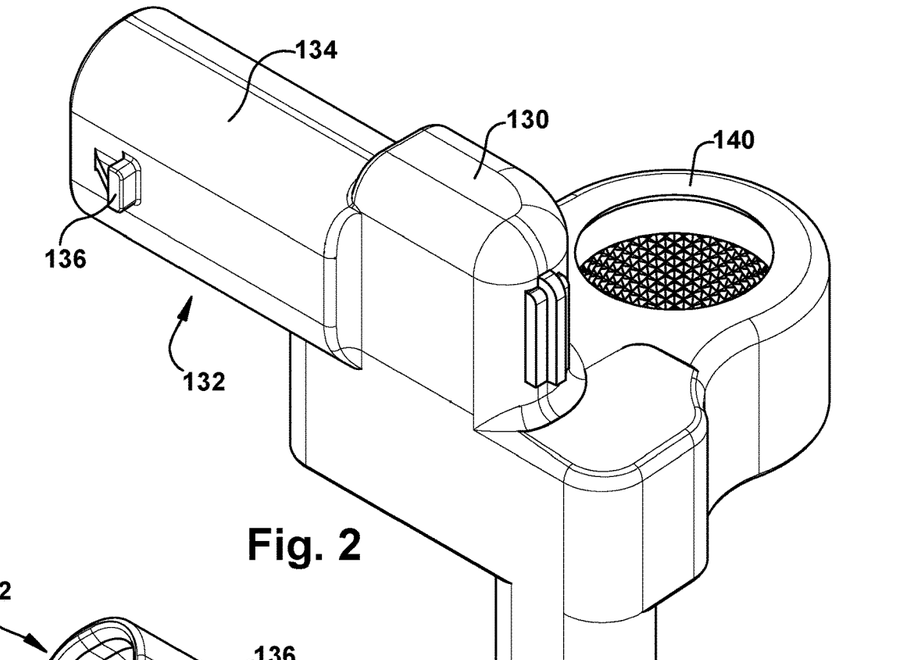
FIGS. 2 and 3 are perspective views of an acceleration sensor portion of the vehicle safety system.
Figure 3:
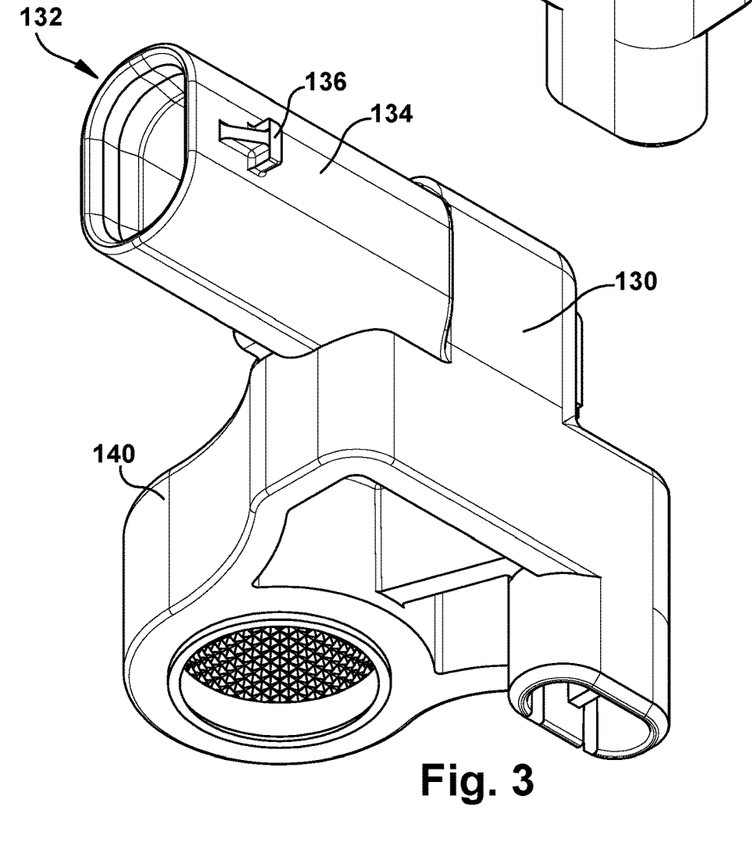
Figure 4:
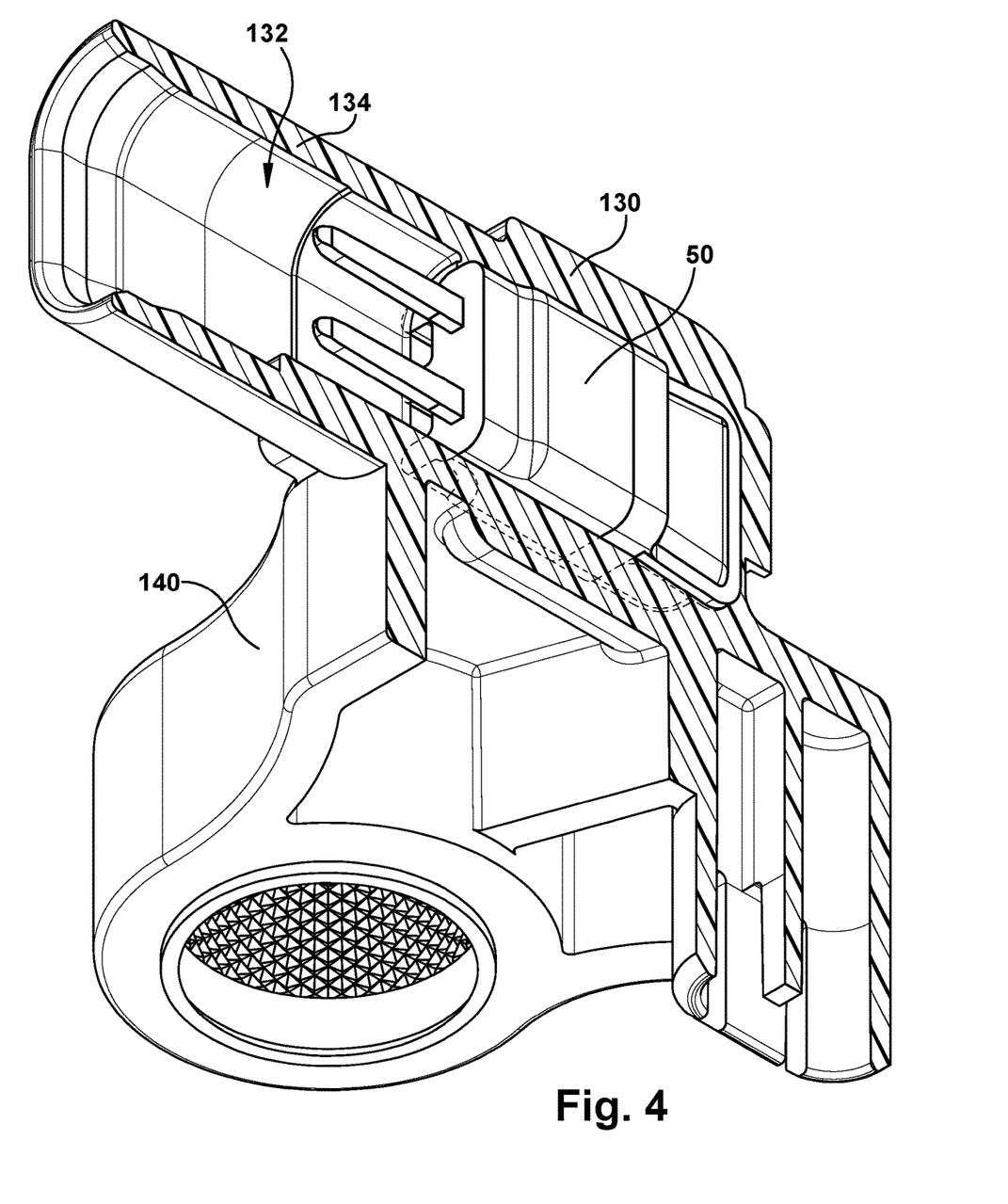
FIG. 4 is a sectional view of the acceleration sensor.

Referring to FIGS. 2-4, to ensure weatherproof performance, the RAS device 50 includes an encapsulation 130. The encapsulation 130 can be formed, for example, of a weatherproof material, such as plastic, and can be assembled or otherwise applied onto the RAS device 50 via insert molding. Alternatively, the encapsulation 130 could be configured so that the RAS device 50 is installed after the encapsulation is formed, i.e., after molding.

The insert molding can be configured to position the pin portions 82 of the contacts 80 in a connector portion 132 that facilitates a weatherproof connection with vehicle wiring that electrically connects the RAS device 50 to the vehicle safety system 10/controller 20. The connector portion 132 can, for example, include a female receptacle 134 configured to receive a male plug (not shown) and that includes a projection 136 for locking the plug in the installed condition.

The RAS device 50 can also include a portion 140 configured to receive hardware, such as a fastener and/or a bushing (not shown), that facilitates connecting the RAS device 50 to the vehicle 12. that is also insert molded in the encapsulation 130.

Figures 5, 6:
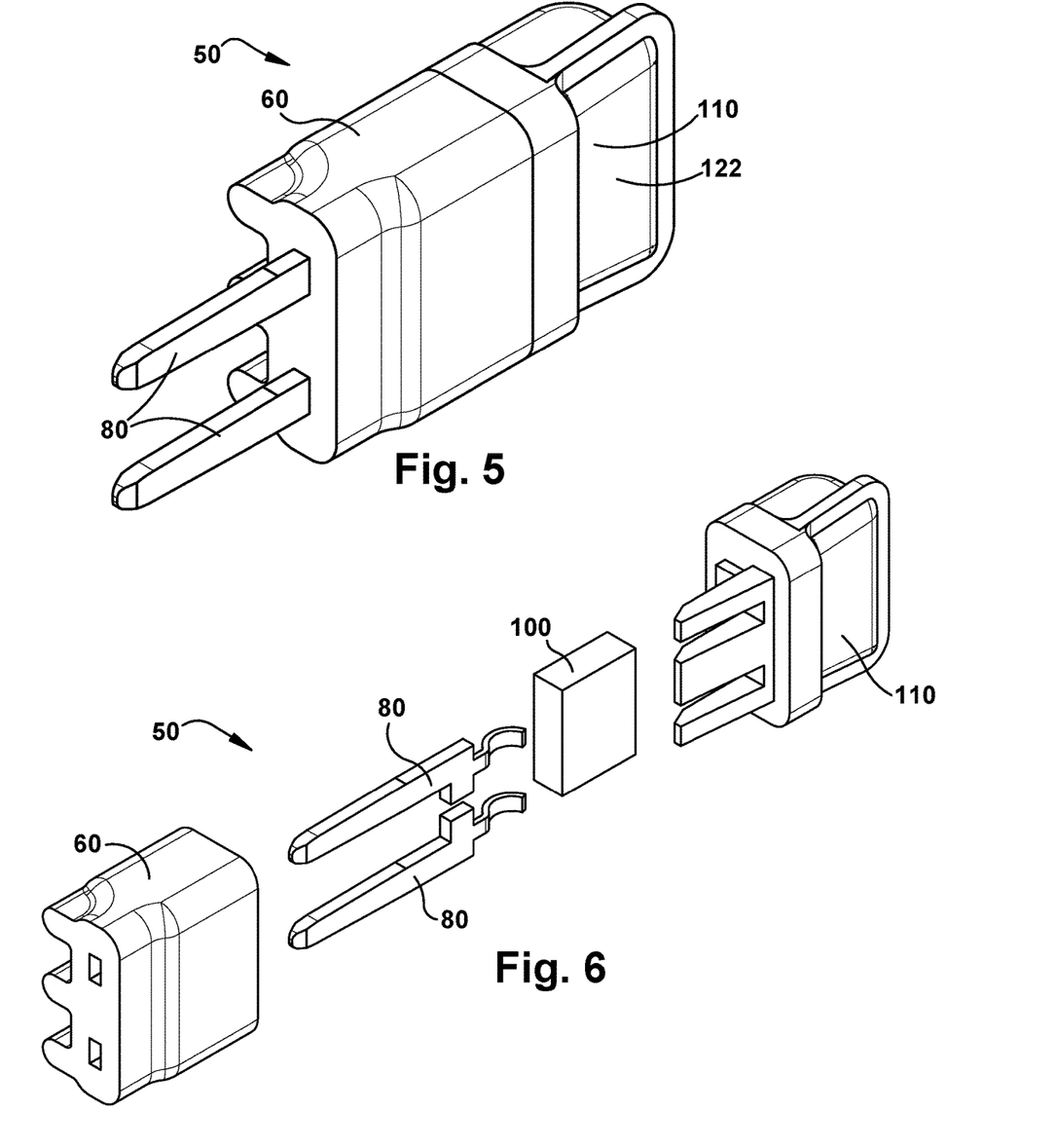
FIG. 5 is a perspective view of a portion of the acceleration sensor.
FIG. 6 is an exploded view of the portion of FIG. 5.
Figure 7A:
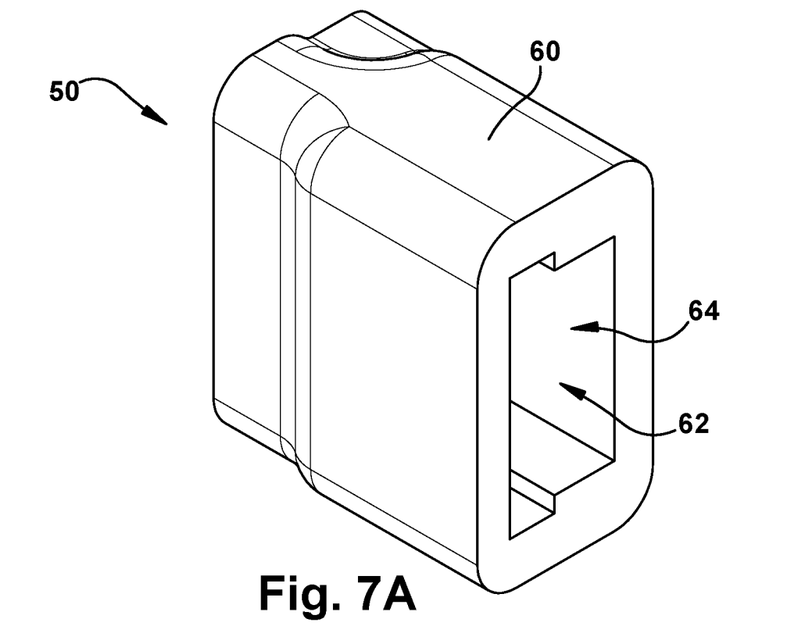
FIG. 7A is a perspective view of one piece from the exploded view of FIG. 6.
Figure 7B:
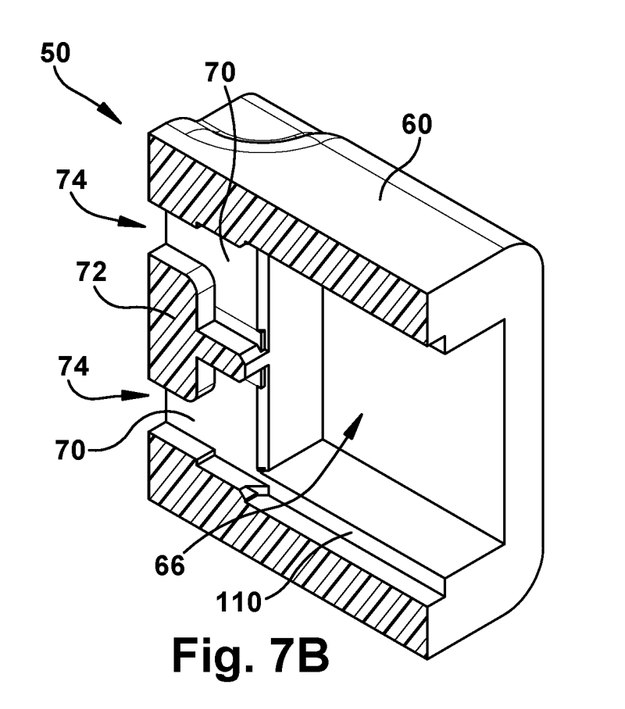
FIG. 7B is a sectional view of the piece of FIG. 7A.

FIGS. 5 and 6 illustrate an example configuration of the RAS device 50 without the encapsulation 130 surrounding it. The RAS device 50 includes a housing 60, a pair of contacts 80, an accelerometer ASIC 100, and a retention clip 110. Construction and assembly of the RAS device 50 is illustrated in FIGS. 7A-9C. Referring to FIGS. 7A and 7B, the RAS device 50 the molded plastic housing 60 includes a front opening 62 that leads to a hollowed interior space 64 in which device components are received. Specifically, the interior space 64 includes a generally rectangular ASIC receptacle 66 and a contact support surface 70 defined partially by a T-shaped projection 72. The projection 72 also helps define a pair of contact openings 74 at an end of the housing 60 opposite the front opening 62.

Figure 8A:
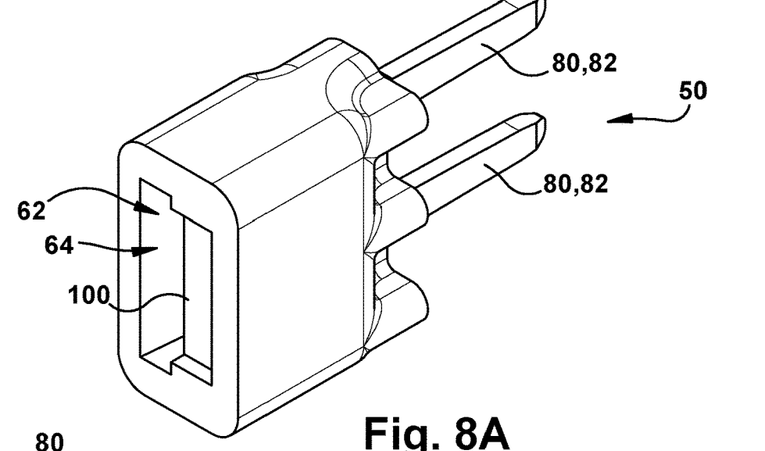
FIGS. 8A-8E illustrate assembly steps for the portion of the acceleration sensor of FIGS. 5 and 6.
Figure 8B:
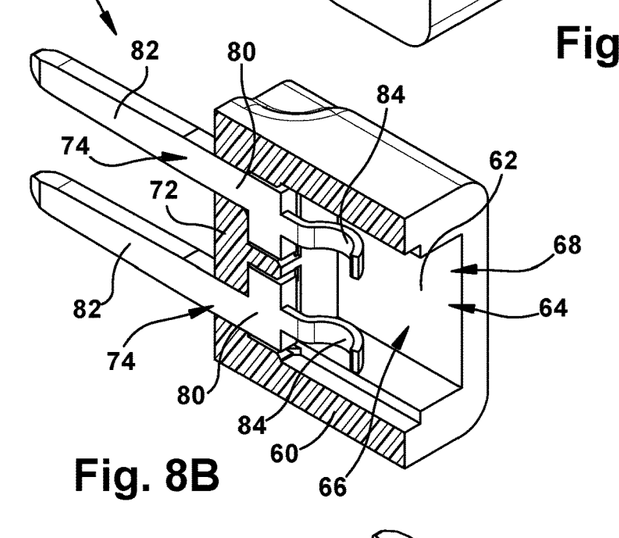

Referring to FIGS. 8A and 8B, the contacts 80 are received in the housing 60 and supported on the contact support surfaces 70. The contacts 80 are electrically conductive, formed from a metal material, such as copper, steel, or alloys thereof. The contacts 80 include a pin portion 82 that projects outside the housing 60 and a spring contact portion 84 supported in the ASIC receptacle 66 of the interior space 64, spaced from its bottom surface 68.

Figure 8C:
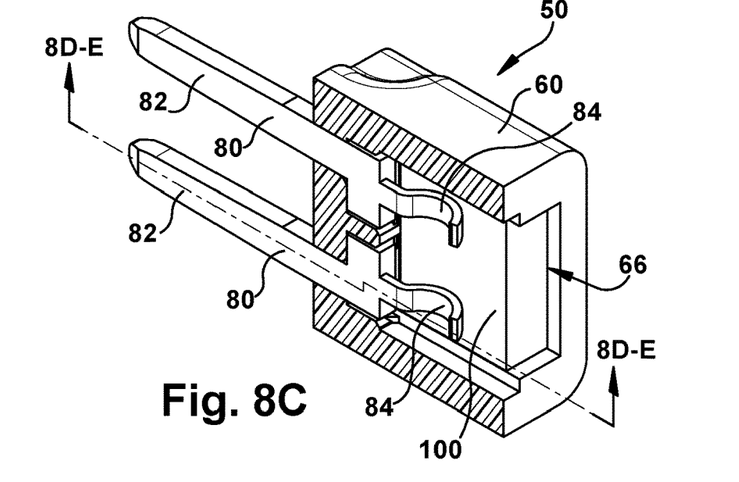

To reach the position illustrated in FIGS. 8A-8C, the contacts 80 are installed through the front opening 62 pin portions 82 first. Once the pin portions 82 project from the contact openings 74, they can be pulled through into the illustrated installed position. The T-shaped projection 72 and the openings 74 can be configured with a close fit, or even to a slight interference fit with the contacts 80 to hold them in place. Additionally, the height of the contact openings 74 can be matched to the thickness of the contacts 80 to have a close fit, or even a slight interference fit with the contacts to hold them in place. The position of the contacts 80 in the housing 60 can thus be held firm.

Figure 8D:
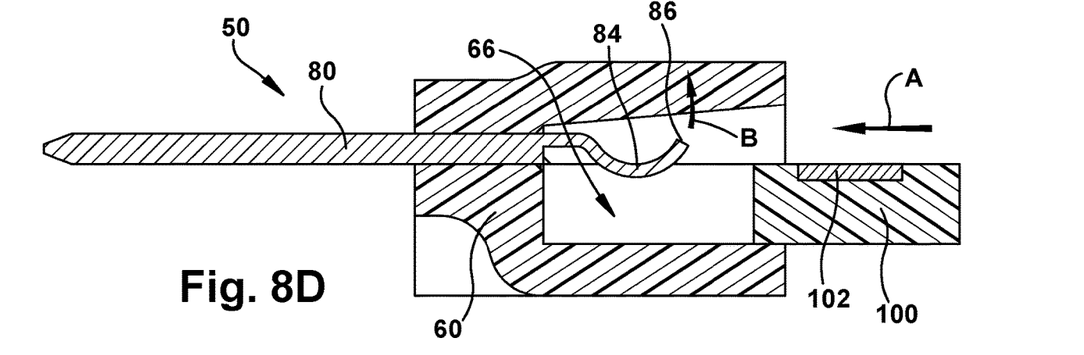
Figure 8E:
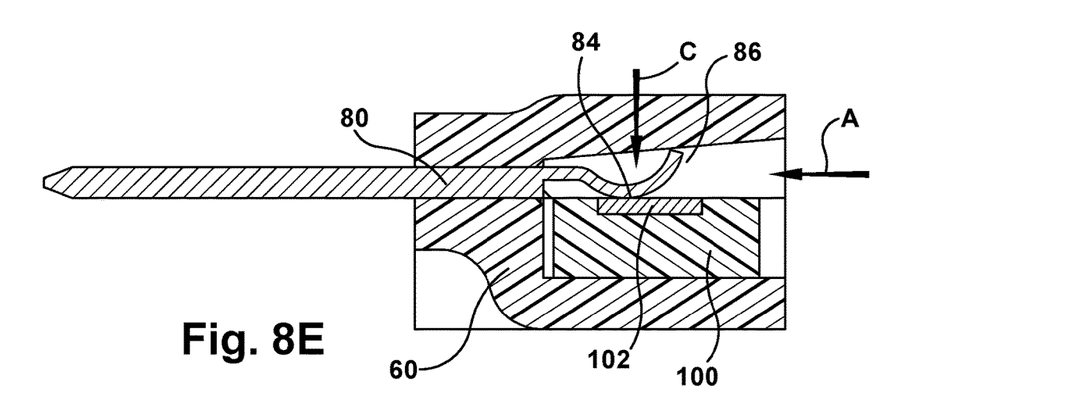

The accelerometer ASIC 100 includes contact pads 102 on its upper surface. Referring to FIGS. 8A and 8C, after the contacts 80 are installed, the ASIC 100 is installed by insertion into the front opening 62. The ASIC 100 is received in the ASIC receptacle 66, which is configured to mate with the shape of the ASIC. Referring to FIG. 8D, as the ASIC 100 is inserted into the ASIC receptacle 66 in the direction indicated generally at arrow A, it initially engages the spring contact 84 of the contact 80.

As the ASIC 100 continues in the installation direction, it contacts an end 86 of the spring contact 84. The end 86 is configured to create normal forces that act on the spring contact 84 in response to insertion of the ASIC 100. These normal forces urge the spring contact 84 upward, as indicated generally by the arrow B in FIG. 8D. The ASIC 100 proceeds in the insertion direction A until it reaches the installed position of FIG. 8E. Owing at least in part to the firm manner in which the contacts 80 are held in the housing 60, in the installed condition, the spring contact 84 remains deflected and, as such, exerts a downward spring force on the contact pad 102, as indicated generally at arrow C in FIG. 8E. This helps maintain the electrically conductive engagement between the contact 80 and the ASIC 100.

Figure 9A:
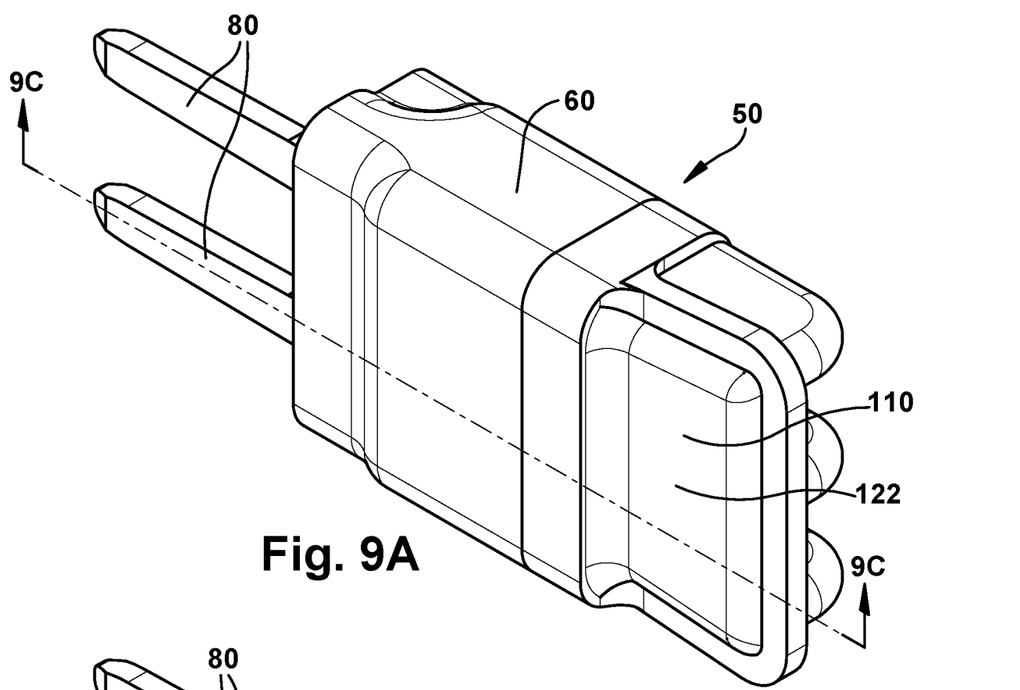
FIGS. 9A-9C illustrate final assembly steps for the portion of the acceleration sensor of FIGS. 5 and 6.
Figure 9B:
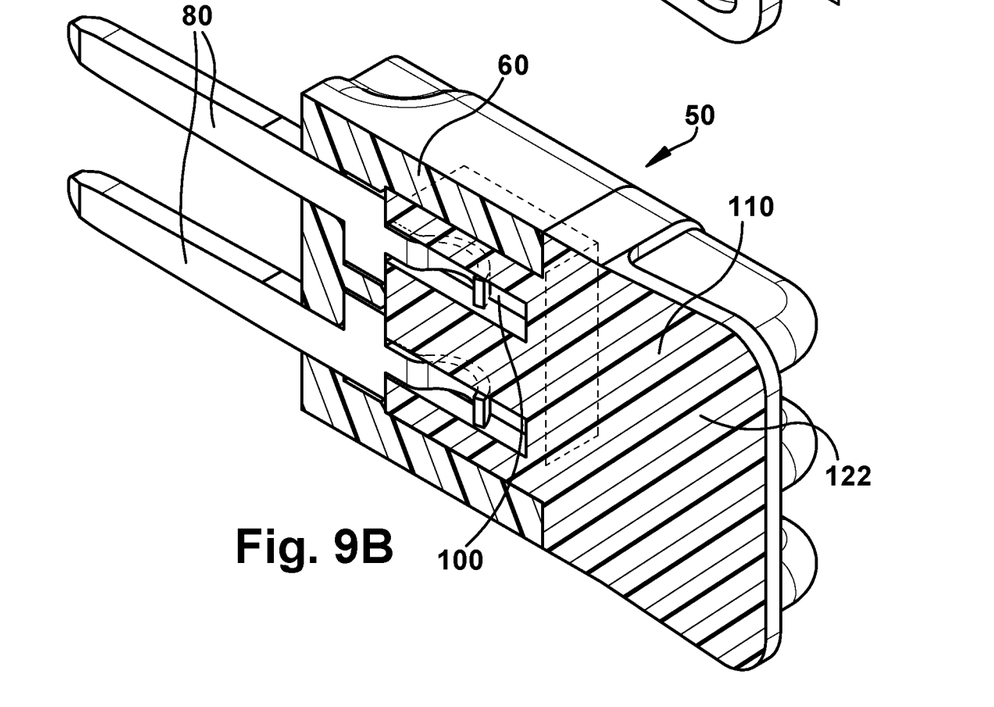
Figure 9C:
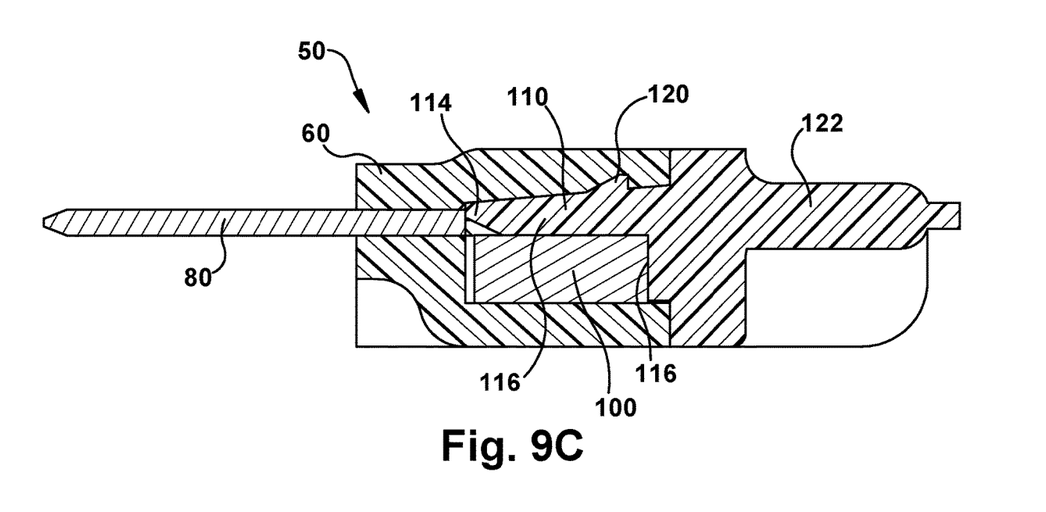

Referring to FIGS. 9A-9C, the RAS device 50 also includes a retention clip 110 that installs in the housing 60 through the front opening 62. The retention clip 110 rides along portions 112 of the surface 70 (See FIG. 7B) and has portions 114 that engage the contacts 80 and retain them in their installed position. The retention clip 110 also has portions 116 that engage and retain the ASIC 100 in its installed position. The retention clip 110 can be held in place by an interference fit or it can also include retention features or elements 120, such as projections (illustrated schematically in FIG. 9C) that retain the clip in its installed condition. The retention clip 110 further includes a portion 122 that can serve as a handle for installing the clip and also for helping to facilitate the encapsulation 130, which is described above.

From the above description of the invention, those skilled in the art will perceive improvements, changes and modifications that do not affect the spirit and scope of the RAS device 50 disclosed herein. Such improvements, changes and modifications within the skill of the art are intended to be covered by the appended claims.

Having described the invention, the following is claimed:

1. An apparatus for measuring vehicle acceleration, comprising:
   a housing comprising an interior space;
   one or more contacts supported in the housing, each of the contacts comprising a pin portion that extends outside the housing and a spring contact portion positioned above an ASIC receptacle inside the housing;
   an accelerometer ASIC positioned in the ASIC receptacle in the housing, wherein the accelerometer ASIC comprises contact pads that engage the spring contact portions of the one or more contacts and cause the spring contact portions to deflect, the resilient spring characteristics of the spring contact portions applying a retention force on the accelerometer ASIC; and
   a retention clip connected to the housing and having a portion extending into the interior space, the retention clip comprising a portion that engages the housing to secure the retention clip in an installed condition in the housing, wherein the retention clip comprises portions that engage the one or more contacts and maintain the position of the one or more contacts inside the housing, and portions that engage the accelerometer ASIC and maintain the position of the accelerometer ASIC inside the housing.

2. The apparatus recited in claim 1, wherein the housing comprises a contact support surface upon which the one or more contacts are supported and contact openings through which the contact pin portions extend, wherein the retention clips when installed maintains the contact pin portions fully inserted through the contact openings and maintains the contact positioned against the contact support surface.

3. The apparatus recited in claim 2, wherein the retention clip comprises a retention element that engages the housing and retains the retention clip in the housing.

4. The apparatus recited in claim 1, further comprising an encapsulation that encapsulates the housing and the retention clip with the one or more contacts and acceleration ASIC installed, the encapsulation comprising a weatherproof material that forms a weather tight seal of the housing.

5. The apparatus recited in claim 4, further comprising a connection bushing that is connected to the apparatus via the encapsulation.

6. The apparatus recited in claim 4, wherein the encapsulation comprises a connector portion that surrounds the pin portions of the contacts and facilitates a connection with vehicle wiring to electrically connect the apparatus to a controller.

7. The apparatus recited in claim 6, wherein the connector portion comprises a female receptacle configured to receive a male plug, the connector portion further comprising a projection for locking the plug in the installed condition.

8. A vehicle safety system comprising the apparatus of claim 1.

9. The vehicle safety system recited in claim 8, further comprising a safety device and a controller for controlling actuation of the safety device, wherein the apparatus is electrically connected to the controller and operative to provide a signal to the controller indicative of sensed vehicle accelerations, wherein the controller is configured to actuate the safety device in response to the signal.

10. The vehicle safety system recited in claim 1, wherein the retention clip further comprises a handle portion for facilitating installation of the retention clip in the housing.

* * * * *